(12) United States Patent
Toutant

(10) Patent No.: US 9,864,825 B2
(45) Date of Patent: Jan. 9, 2018

(54) SYSTEMS AND METHODS FOR DYNAMIC SYMBOLS FOR DEVICES IN ELECTRICAL SCHEMATICS

(71) Applicant: Ciena Corporation, Hanover, MD (US)

(72) Inventor: Roger Paul Toutant, Ottawa (CA)

(73) Assignee: Ciena Corporation, Hanover, MD (US)

( * ) Notice: Subject to any disclaimer, the term of this patent is extended or adjusted under 35 U.S.C. 154(b) by 17 days.

(21) Appl. No.: 15/011,779

(22) Filed: Feb. 1, 2016

(65) Prior Publication Data

US 2017/0220721 A1 Aug. 3, 2017

(51) Int. Cl.
*G06F 17/50* (2006.01)

(52) U.S. Cl.
CPC ...... *G06F 17/5054* (2013.01); *G06F 2217/04* (2013.01); *G06F 2217/74* (2013.01)

(58) Field of Classification Search
CPC .................................................. G06F 17/5054
USPC .................................................. 716/101, 102
See application file for complete search history.

(56) References Cited

U.S. PATENT DOCUMENTS

| 6,243,851 | B1 | 6/2001 | Hwang et al. |
| 6,457,164 | B1 | 9/2002 | Hwang et al. |
| 7,831,944 | B2 | 11/2010 | Kato et al. |
| 7,860,691 | B2 | 12/2010 | Beltran et al. |
| 7,904,863 | B2 | 3/2011 | Kato et al. |
| 7,921,384 | B2 | 4/2011 | Solomon |
| 7,999,827 | B2 | 8/2011 | Ford et al. |
| 8,150,659 | B2 | 4/2012 | Brown |
| 2011/0022976 | A1 | 1/2011 | Huang et al. |
| 2014/0145758 | A1 | 5/2014 | Atsatt et al. |
| 2015/0269052 | A1* | 9/2015 | Huang ................ G06F 11/3409 717/140 |

FOREIGN PATENT DOCUMENTS

JP    EP 2073133 A1 *  6/2009   ......... G06F 17/5045

OTHER PUBLICATIONS

"QuartusII Version 7.2 Handbook, vol. 2: Design Implementation and Optimization", Oct. 2007, Altera Corp., pp. 5.21-5.33.*

* cited by examiner

*Primary Examiner* — Sun Lin
(74) *Attorney, Agent, or Firm* — Clements Bernard Walker PLLC; Christopher L. Bernard; Lawrence A. Baratta, Jr.

(57) ABSTRACT

Computer-implemented systems and methods for manipulation of dynamic symbols for devices in an electrical schematic include: receiving a placement of a dynamic symbol in a schematic, wherein the dynamic symbol represents an instance of an electrical device in the schematic and is separate from a symbol library; receiving an assignment of nets to pins of the dynamic symbol instance; performing a manipulation of the pins based on a logical grouping, wherein the dynamic symbol instance supports dynamic reconfiguration of the pins via the manipulation while retaining pin information from a base symbol in the symbol library; and visually presenting the dynamic symbol instance with the manipulated pins according to the logical grouping.

20 Claims, 8 Drawing Sheets

SYSTEMS AND METHODS FOR DYNAMIC SYMBOLS FOR DEVICES IN ELECTRICAL SCHEMATICS

FIELD OF THE DISCLOSURE

The present disclosure generally relates to computer-implemented systems and methods related to electrical schematics. More particularly, the present disclosure relates to computer-implemented systems and methods for dynamic symbols for devices in electrical schematics such as in Computer Aided Design (CAD) programs.

BACKGROUND OF THE DISCLOSURE

Computer-aided design (CAD) uses computer systems to aid in the creation, modification, analysis, or optimization for design of electrical circuits. CAD software is used to increase the productivity of the designer, improve the quality of design, improve communications through documentation, and to create a database for manufacturing. CAD output is often in the form of electronic files for print, machining, or other manufacturing operations. Exemplary CAD programs for electrical circuit schematic design are provided by Cadence, OrCAD, and the like. These CAD programs enable the design, manufacture, and troubleshoot of electrical circuit schematics, such as Printed Circuit Boards (PCBs) with various components included therein such as Field Programmable Gate Arrays (FPGAs), Application Specific Integrated Circuit (ASIC), Digital Signal Processors (DSPs), Central Processing Units (CPUs), Network Processing Units (NPUs), and the like (collectively "devices"). These devices are represented as symbols in the electrical schematics in the output of the computer program. Each device has associated pins for connectivity thereto which are logically represented in the computer program with pin numbers and device-specific functional pin names.

Through a symbol library, the designer can select and use any of the devices in an electrical circuit design, and engineers and manufacturing personnel can use the output of the electrical circuit design for troubleshooting and the like. As devices proliferate, there can be a vast number of devices available through the computer program, and these are managed by the symbol library. There are generally two conventional techniques for managing symbols in the symbol library, namely a first technique of creating a customized symbol in the symbol library for each unique pin symbol assignment and a second technique of creating a customized symbol in the symbol library with pins grouped according to the pin number. The disadvantage of the first technique is that each time the electrical signal to pin assignment changes, a new library symbol is created which can result in a great deal of time-consuming library work and makes the management of symbols very difficult, inefficient, and costly. The disadvantage of the second technique is that because the electrical signal assignments are often based upon physical device geometries, signals with similar functions tend to be scattered amongst the symbol making it difficult to understand the resulting schematic thus enabling errors to be inadvertently introduced into the design.

Thus, it would be advantageous for CAD software programs to support dynamic symbols which eliminate the aforementioned limitations in both of the techniques above.

BRIEF SUMMARY OF THE DISCLOSURE

In an exemplary embodiment, a computer-implemented method for dynamic symbols for devices in an electrical schematic includes receiving placement of a dynamic symbol in a schematic, wherein the dynamic symbol represents an electrical device in the schematic and is selected from a symbol library; receiving assignment of nets to pins of the dynamic symbol; performing manipulation of the pins based on a logical grouping, wherein the dynamic symbol supports dynamic reconfiguration of the pins via the manipulation while retaining pin information from a base symbol in the symbol library; and visually presenting the dynamic symbol with the manipulated pins. The manipulation can be based on input provided by dragging and dropping the pins to a block associated with the dynamic symbol. The manipulation can be based on one of table-based input and file-based input which provides the logical grouping. The computer-implemented method can further include checking the base symbol in the schematic relative to a current version in the symbol library and notifying of any removed or added pins. The computer-implemented method can further include receiving an update to the base symbol and adding or removing pins based on the update in the base symbol in the symbol library. The computer-implemented method can be performed through a Computer Aided Design (CAD) software program implemented on a server for electrical schematic design. The electrical device can be a Field Programmable Gate Array (FPGA). The logical grouping can be based on one of a functional grouping of the pins, a design preference, and a combination thereof.

In a further exemplary embodiment, a server adapted to provide dynamic symbols for devices in an electrical schematic includes a processor; and memory storing instructions that, when executed, cause the processor to receive placement of a dynamic symbol in a schematic, wherein the dynamic symbol represents an electrical device in the schematic and is selected from a symbol library, receive an assignment of nets to pins of the dynamic symbol, perform manipulation of the pins based on a logical grouping, wherein the dynamic symbol supports dynamic reconfiguration of the pins via the manipulation while retaining pin information from a base symbol in the symbol library, and visually present the dynamic symbol with the manipulated pins. The manipulation can be based on input provided by dragging and dropping the pins to a block associated with the dynamic symbol. The manipulation can be based on one of table-based input and file-based input which provides the logical grouping. The memory storing instructions that, when executed, can further cause the processor to check the base symbol in the schematic relative to a current version in the symbol library and notifying of any removed or added pins. The memory storing instructions that, when executed, can further cause the processor to receive an update to the base symbol and adding or removing pins based on the update in the base symbol in the symbol library. The server can execute a Computer Aided Design (CAD) software program for electrical schematic design. The electrical device can be a Field Programmable Gate Array (FPGA). The logical grouping can be based on one of a functional grouping of the pins, a design preference, and a combination thereof.

In a further exemplary embodiment, software stored in a non-transitory computer readable medium includes instructions that, when executed, cause a processor to perform the steps of receiving placement of a dynamic symbol in a schematic, wherein the dynamic symbol represents an electrical device in the schematic and is selected from a symbol library; receiving assignment of nets to pins of the dynamic symbol; performing manipulation of the pins based on a logical grouping, wherein the dynamic symbol supports dynamic reconfiguration of the pins via the manipulation while retaining pin information from a base symbol in the symbol library; and visually presenting the dynamic symbol with the manipulated pins. The instructions that, when executed, can further cause the processor to perform the step of checking the base symbol in the schematic relative to a current version in the symbol library and notifying of any removed or added pins. The instructions that, when executed, can further cause the processor to perform the step of receiving an update to the base symbol and adding or removing pins based on the update in the base symbol in the symbol library. The logical grouping can be based on one of functional grouping of the pins, a design preference, and a combination thereof.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to computer-implemented systems and methods for dynamic symbols for devices in electrical schematics such as in Computer Aided Design (CAD) programs. Dynamic symbols are a new feature in schematic capture tools, i.e., computer programs such as CAD programs, for use in the creation of electrical schematics, particularly ones that have reconfigurable devices such as FPGAs and the like. Generally, the dynamic symbols seek to combine the benefits of the first and second techniques described herein, while eliminating their associated limitations. Advantageously, the dynamic symbols eliminate a need to create a customized library symbol for each unique electrical signal assignment thus reducing the effort spent on creating and maintaining library symbols, compared to the first technique. The dynamic symbols enable greater clarity in schematic designs due to the ability to dynamically group functional pins together resulting in a commensurate reduction of errors, compared to the second technique. Further, the dynamic symbols provide an ability for designers to customize the symbol pin placements to satisfy their personal design preferences. That is, the objective of the dynamic symbols and associated use in electrical circuit schematics is to improve readability, assist in engineering design, and enhance factory debugging.

The computer-implemented systems and methods enable dynamic reconfiguration of a symbol once it is placed into a schematic, yet retaining its basic pinout information to the base symbol in the library. Further, the computer-implemented systems and methods include the ability to re-order pins in the schematic using table-based input, file-based input, point-and-click manipulation, etc.; the ability to create and delete symbol parts as preferred by the designer; the ability to alert the designer of any changes to the underlying base symbol in the library; the ability to use group-highlight and copy/paste features as commonly used today in CAD Graphical User Interface (GUI) applications for other functions; and the like.

First and Second Technique for Device Symbols

Figure 1:
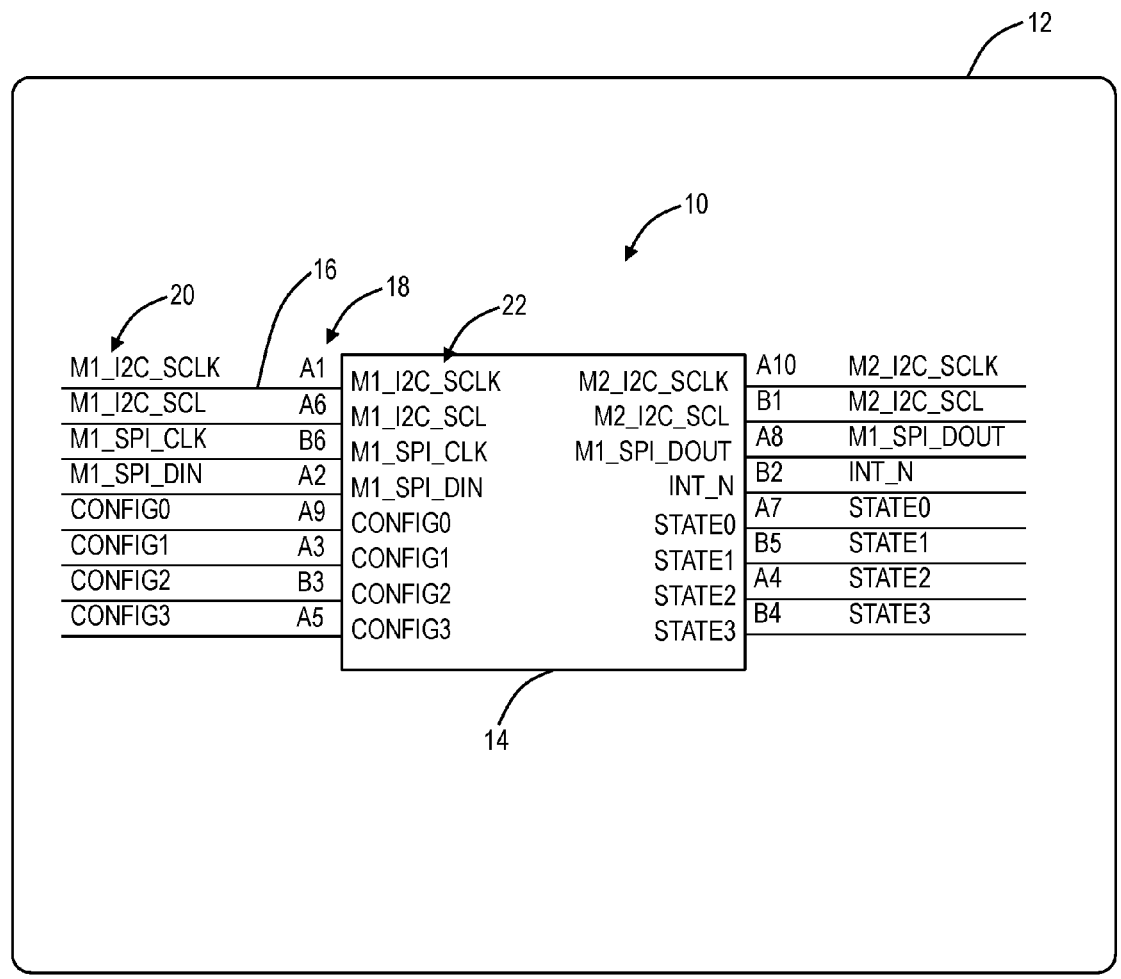
FIGS. 1 and 2 are visual diagrams of a symbol arranged according to the first technique (FIG. 1) and the second technique (FIG. 2) in a graphical representation, such as on a computer program for electrical circuit schematic design (e.g., a CAD program)
Figure 2:
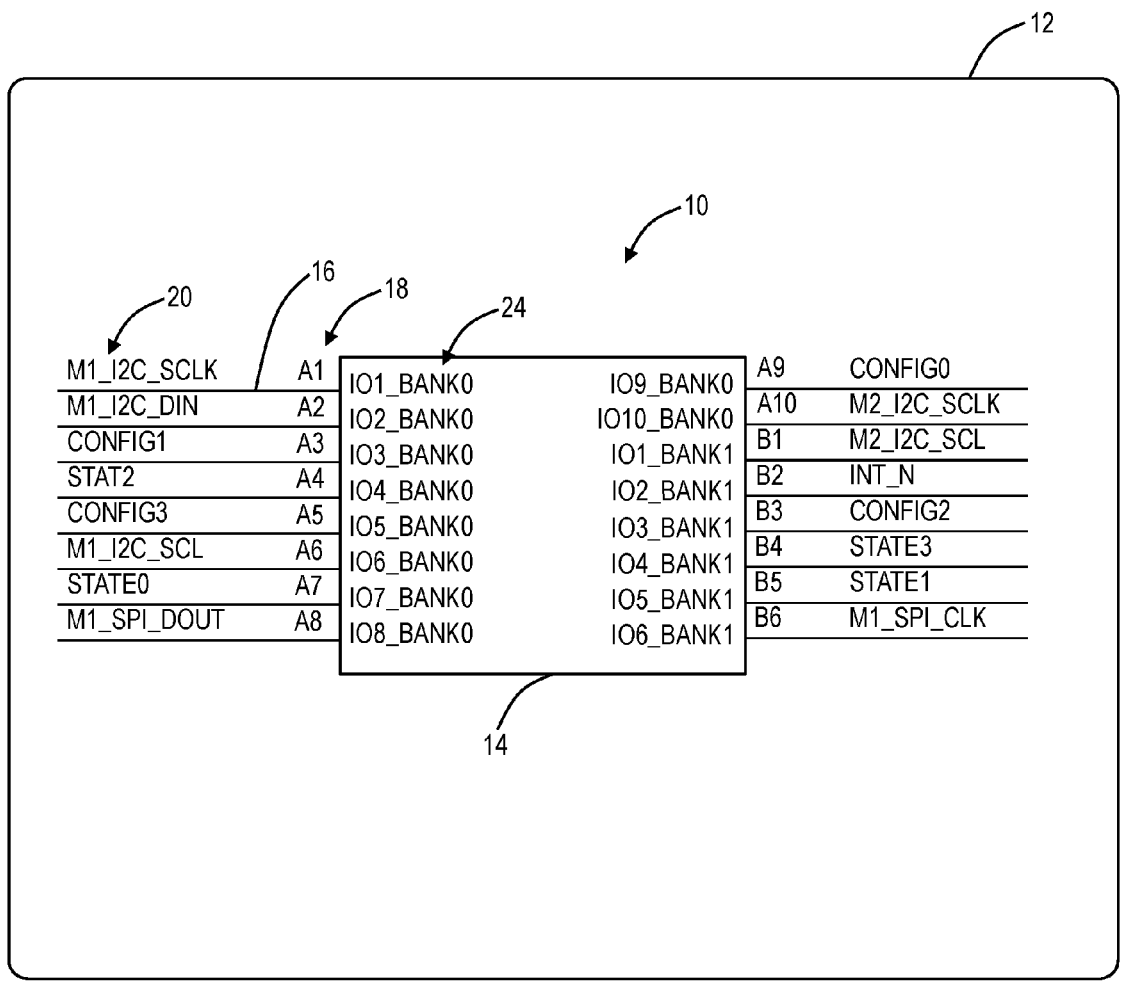

Referring to FIGS. 1 and 2, in exemplary embodiments, visual diagrams illustrate a symbol 10 arranged according to the first technique (FIG. 1) and the second technique (FIG. 2) via a computer program, such as a CAD program. Specifically, FIGS. 1 and 2 include a screen shot of a Graphical User Interface (GUI) 12 associated with the computer program. The GUI 12 displays the symbol 10, a symbol library, and various other tools for implementing CAD functionality. Of course, the output of the computer program may include other forms, e.g., printed, etc. The symbol 10 is a visual representation of a physical device used in electrical schematics to indicate pin assignments and connections. The symbol 10 includes a block 14 representing the electrical device itself associated with the symbol 10. Again, the electrical device can include FPGAs, ASICs, DSPs, CPUs, NPUs, or the like; thus, the block 14 represents the associated functionality of the electrical device. The symbol 10 further includes various pins 16 connected to the block 14. The pins 16 represent in input and output connections to the electrical device, i.e., the pins 16 are visual representations of physical connections, such as copper traces, wires, or the like to the electrical device.

Each pin 16 includes an associated pin number 18. For example, FIGS. 1 and 2 include pin numbers A1 through A10 and B1 through B6. Each pin 16 further includes a device-specific functional pin name 20. Again, for example, FIGS. 1 and 2 include functional pin names 20 or net names such as M1_I2C_SCLK, M2_I2C_SCLK, CONFIG0, STATE0, etc. In one approach (not shown in FIGS. 1 and 2), the symbol 10 can have a fixed nature where the pin numbers 18 and the device-specific functional pin name 20 are fixed in the symbol 10 in the symbol library. For devices with fixed pin functions, this fixed nature can work well. However, for reconfigurable devices such as FPGAs, this is unmanageable and the first and second technique are used to manage the fixed pins.

FIG. 1 illustrates the first technique which includes the creation of a customized library symbol for each unique electrical signal assignment. In FIG. 1, the symbol 10 includes the pins 16 visually arranged based on the device-specific functional pin name 20. That is, the pins 16 are out of order from their pin numbers 18 in the actual physical implementation. Instead, the pins 16 are logically grouped based on function, i.e., the device-specific functional pin name 20. Further, in FIG. 1, the block 14 includes labels 22 visually inside the block 14 with the labels 22 being the device-specific functional pin name 20. The advantage of the first technique in FIG. 1 is it has improved readability due to the logical grouping based on function. However, the first technique in FIG. 1 requires an entirely new symbol 10 each time a pin 16 changes its function. That is, the same device could be represented by numerous symbols 10. This is unmanageable as the symbol library could have a significant number of symbols 10. For example, if the signal "M1_I2C_SCLK" in the upper right was to be moved from pin 16 A1 to another pin, say pin 16 "B4," then a new symbol 10 would need to be created.

FIG. 2 illustrates the second technique which includes the creation of the symbol 10 with the pins 16 grouped according to their pin number 18. In FIG. 2, the symbol 10 includes the pins 16 visually arranged in order of the pin numbers 18; thus, the pins 16 are in order from the pin numbers 18 in the actual physical implementation. The block 14 includes labels 24 visually inside the block 14 with the labels 24 being a generic pin name. The advantage of the second technique in FIG. 2 is there can be a standard symbol 10 in the symbol library. Thus, the symbol library is much more manageable relative to the first technique. However, the second technique is not nearly as readable as the first technique, i.e., the device-specific functional pin names 20 are scattered in FIG. 2.

Dynamic Symbols

Figure 3:
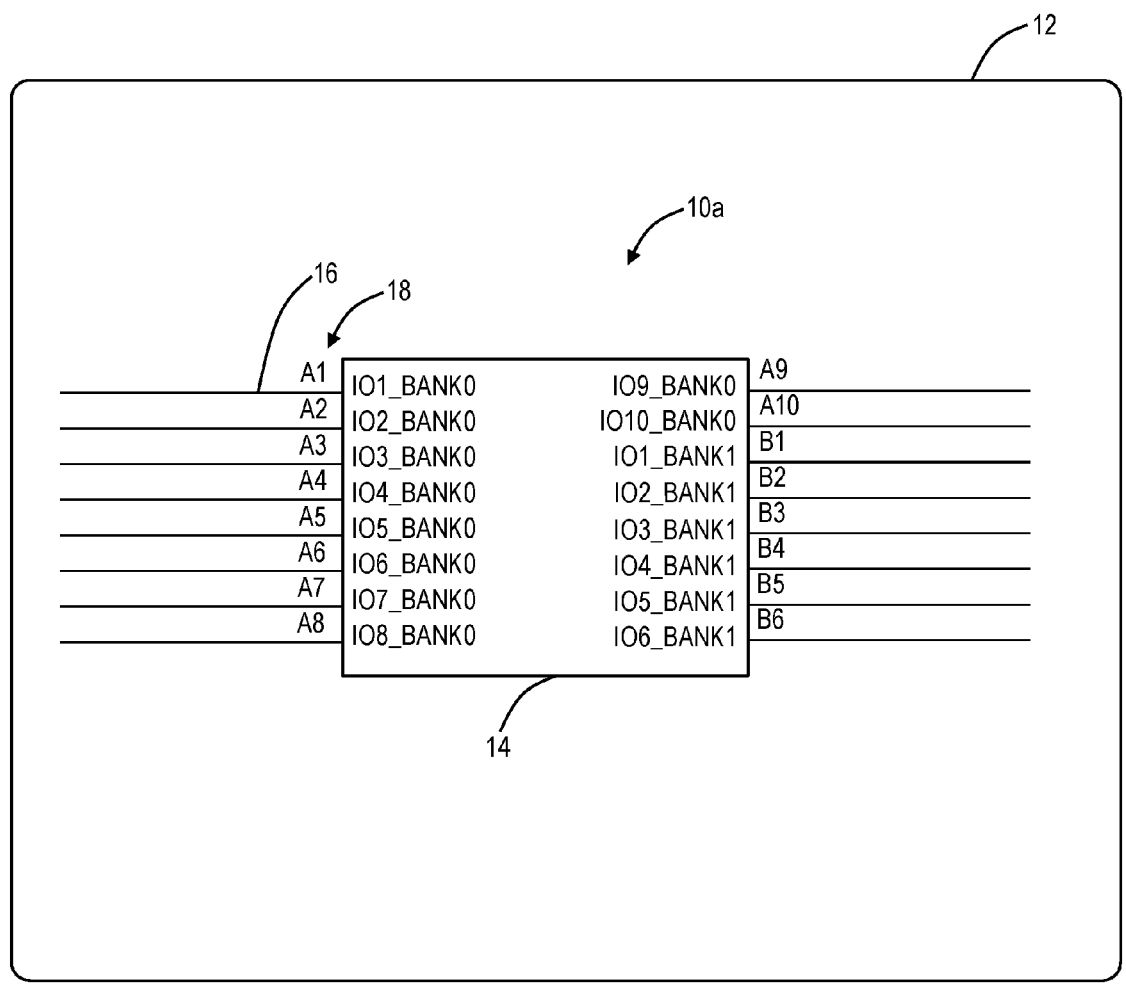
FIGS. 3, 4, and 5, in exemplary embodiments, visual diagrams illustrate the symbol arranged according to dynamic symbol techniques using the computer-implemented systems and methods via a computer program, such as a CAD program.
Figure 4:
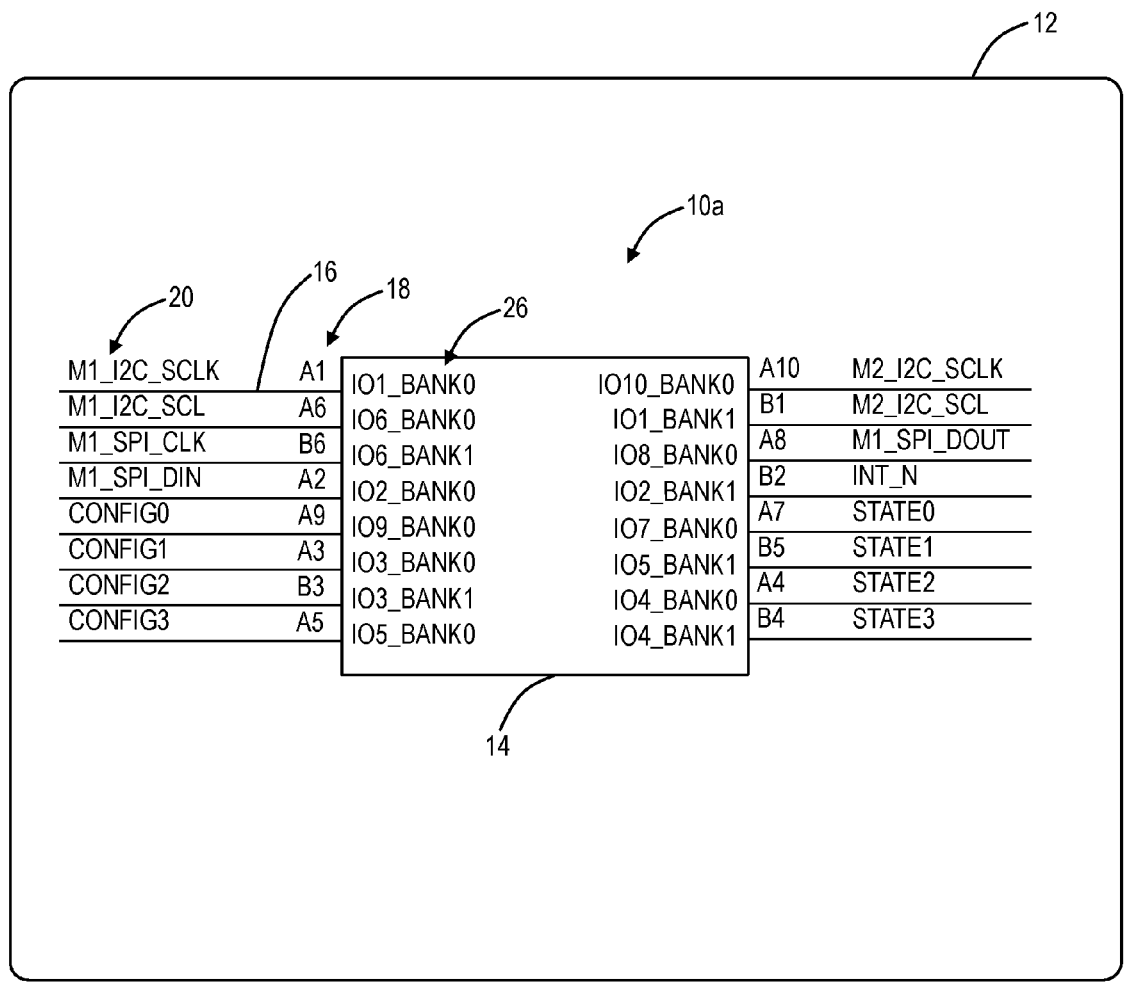
Figure 5:
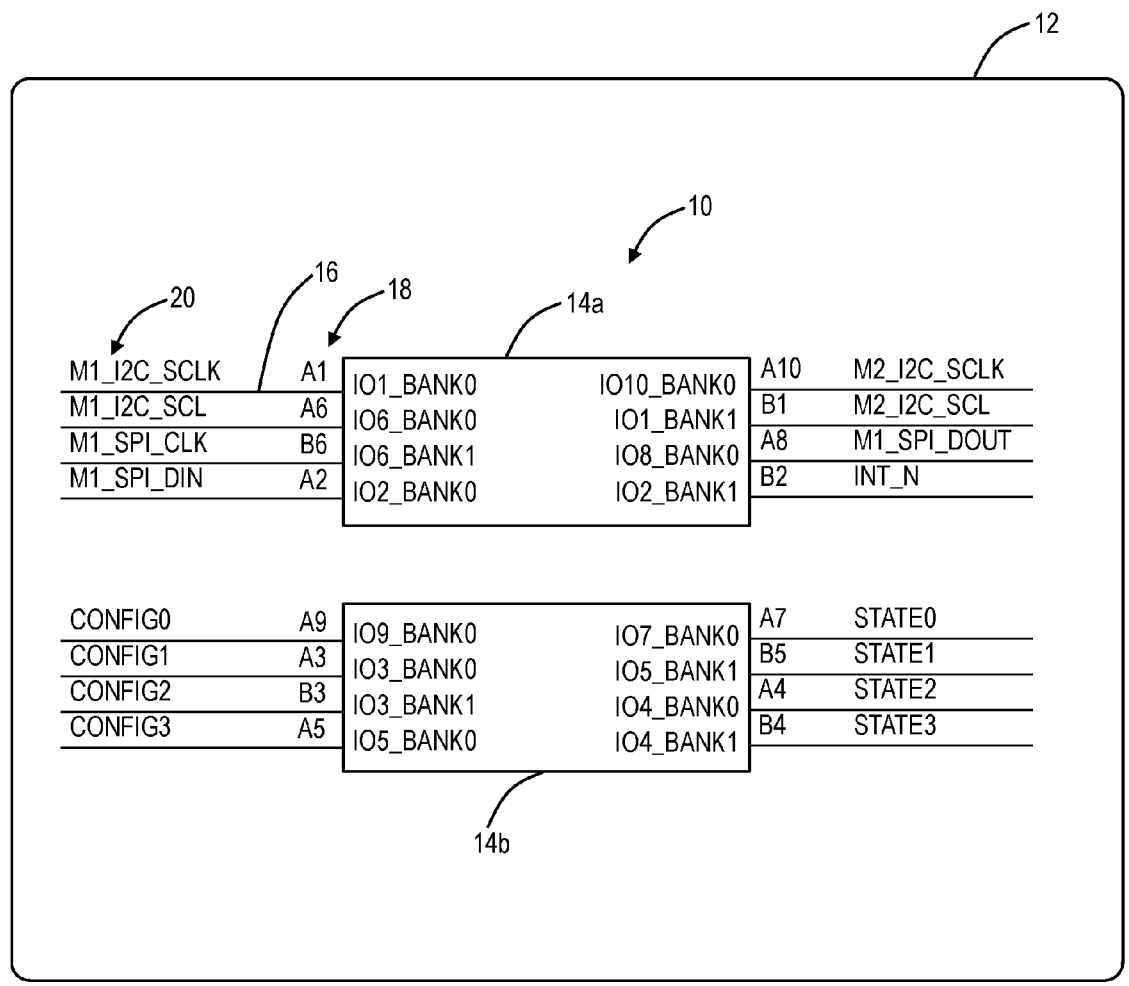

Referring to FIGS. 3, 4, and 5, in exemplary embodiments, visual diagrams illustrate the symbol 10 arranged according to dynamic symbol techniques using the computer-implemented systems and methods via a computer program, such as a CAD program. With the dynamic symbol, in the computer program, a base library symbol is created using the second technique, which can be referred to as a pin number technique as the pins 16 are arranged in order relative to the block 14. Thus, the number of the symbols 10 in the symbol library is minimized, relative to the first technique. FIG. 3 illustrates a base symbol 10a which is placed in a schematic, such as in the GUI 12. Note, the base symbol 10a in FIG. 3 is similar to the symbol 10 in FIG. 2, without the device-specific functional pin name 20.

Once the base symbol 10a is placed in the schematic and connections made to the pins 16 and the device-specific functional pin names 20 are included, a designer is able to "drag" the pins 16 to different locations around the block 14 such that the pins 16 can be grouped in a functional view, similar to the first technique. Note, the designer can drag the pins 16 through the GUI or use table-based input or file-based input to rearrange the pins 16. This is shown in FIG. 4 after the designer has rearranged the pins 16, in a logical grouping similar to an output of the first technique. Also, new symbol parts, i.e., labels 26 can be created within the schematic to accommodate moved pins 16. This provides dynamic symbols. Again, the dynamic symbol 10a is easy (readable) similar to the first technique in FIG. 1 but minimizes the symbol library like the second technique in FIG. 2. Further, the dynamic symbol 10a can include segmentation of the block 14 into blocks 14a, 14b as shown in FIG. 5, to arrive at an easy to read and understand symbol.

Dynamic symbols are a new feature in schematic capture tools for use in the creation of electrical schematics, particularly ones that have reconfigurable devices that are represented in the schematic such as FPGAs. A base library symbol for the dynamic symbol 10a is created using the pin number method (the second technique). The dynamic symbol 10a typically does not change and can be used in many designs.

Computer-implemented Process for Dynamic Symbols—Designer

Figure 6:
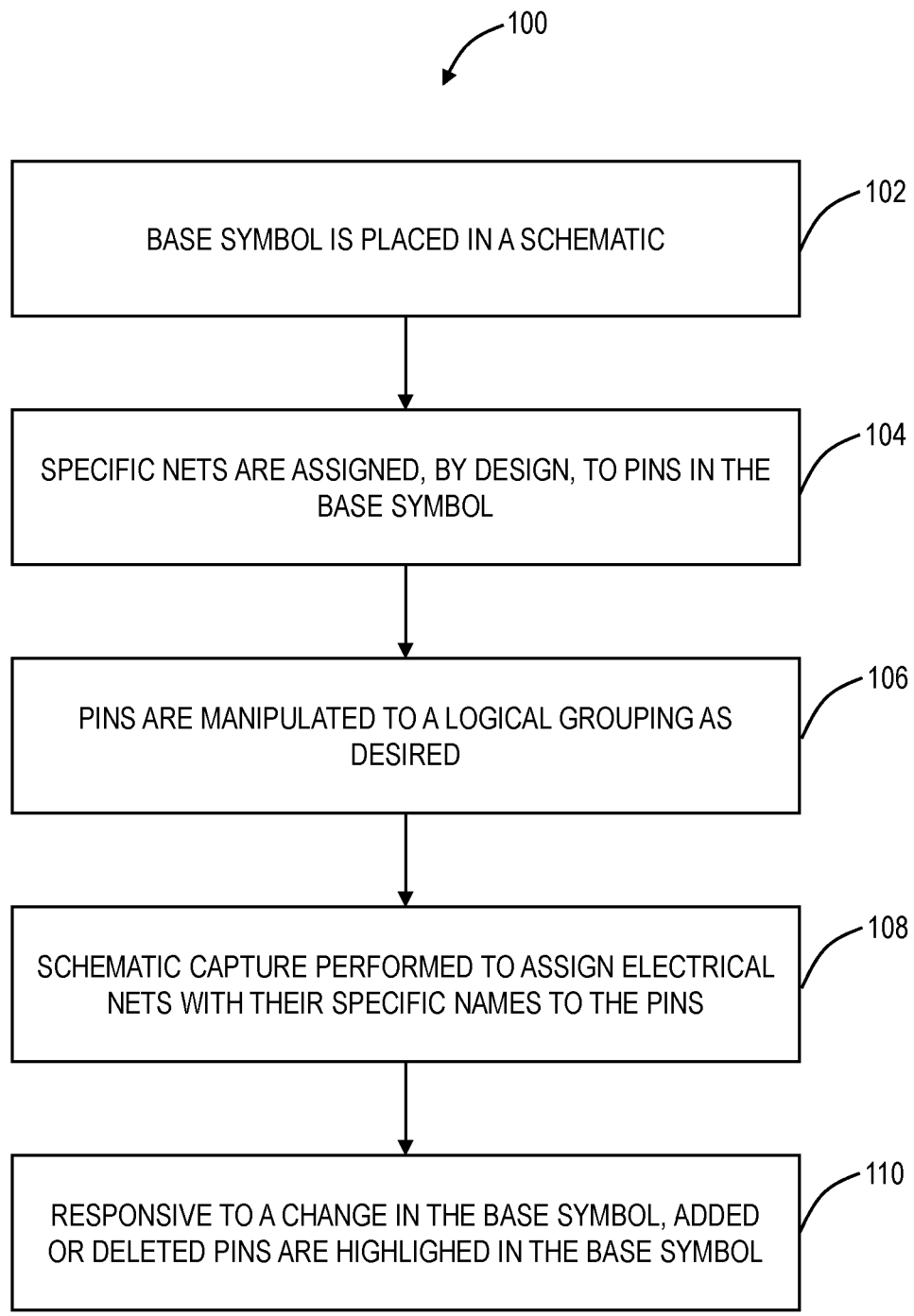
FIG. 6 is a flowchart of a computer-implemented process for the dynamic symbol techniques via a computer program, such as a CAD program.

Referring to FIG. 6, in an exemplary embodiment, a flowchart illustrates a computer-implemented process 100 for the dynamic symbol techniques via a computer program, such as a CAD program. The computer-implemented process 100 contemplates operation on a computer, such as a server illustrated in FIG. 8. For illustration purposes, the computer-implemented process 100 is described relative to activity by a designer. The computer-implemented process 100 includes, for a particular design's schematic, placing the base symbol in a schematic (step 102). Again, the base symbol at step 102 can be the base symbol 10a in FIG. 3. Specific nets are assigned, based on design intent, to pins in the base symbol (step 104). Note, nets, in electrical schematics are a wire or other physical connection (e.g., copper traces, etc.) which connects things, a bus is multiple nets in one.

Once the specific nets are assigned, by design intent, to the dynamic symbol, then the pins are manipulated to a logical grouping as desired (step 106). Such manipulation would transform FIG. 3 into FIG. 4 or 5. In an exemplary embodiment, the designer can make use of the dynamic symbol in the CAD GUI by dragging & dropping the pins amongst the existing symbol parts, or dynamically created new parts, of the symbol such that they can be grouped by functional basis or by designer preference. A highlight-group copy/paste feature could be used. In another exemplary embodiment, the pins can be automatically re-ordered in the schematic according to different criteria such as signal name based upon rules specified in a table or external file. This latter step process can be repeated each time the signal to pin assignment changes during the design cycle.

Next, normal schematic capture activity is performed by assigning electrical nets with their specific names to the dynamic device symbols part pins (step 108). In the case where the base library symbol changes, added pins or deleted pins are highlighted in the dynamic symbol and its parts to alert the designer of change to the base symbol (step 110). For example, step 110 can be performed as part of design rule checks in the schematic.

An important aspect of the dynamic symbols is that where the base library symbol spans multiple schematic symbols parts, the dynamic feature allows pins to be dragged amongst the parts. When a part becomes empty of any pins because they have all been moved out, it is reasonable to expect the designer to be able to delete the empty part. Similarly, when a symbol becomes full, it is reasonable to expect the designer to be able to create another part. Similarly, it is reasonable to expect the designer to be able to delete and create parts according to his preference.

Computer-implemented Process for Dynamic Symbols—Computer Program

Figure 7:
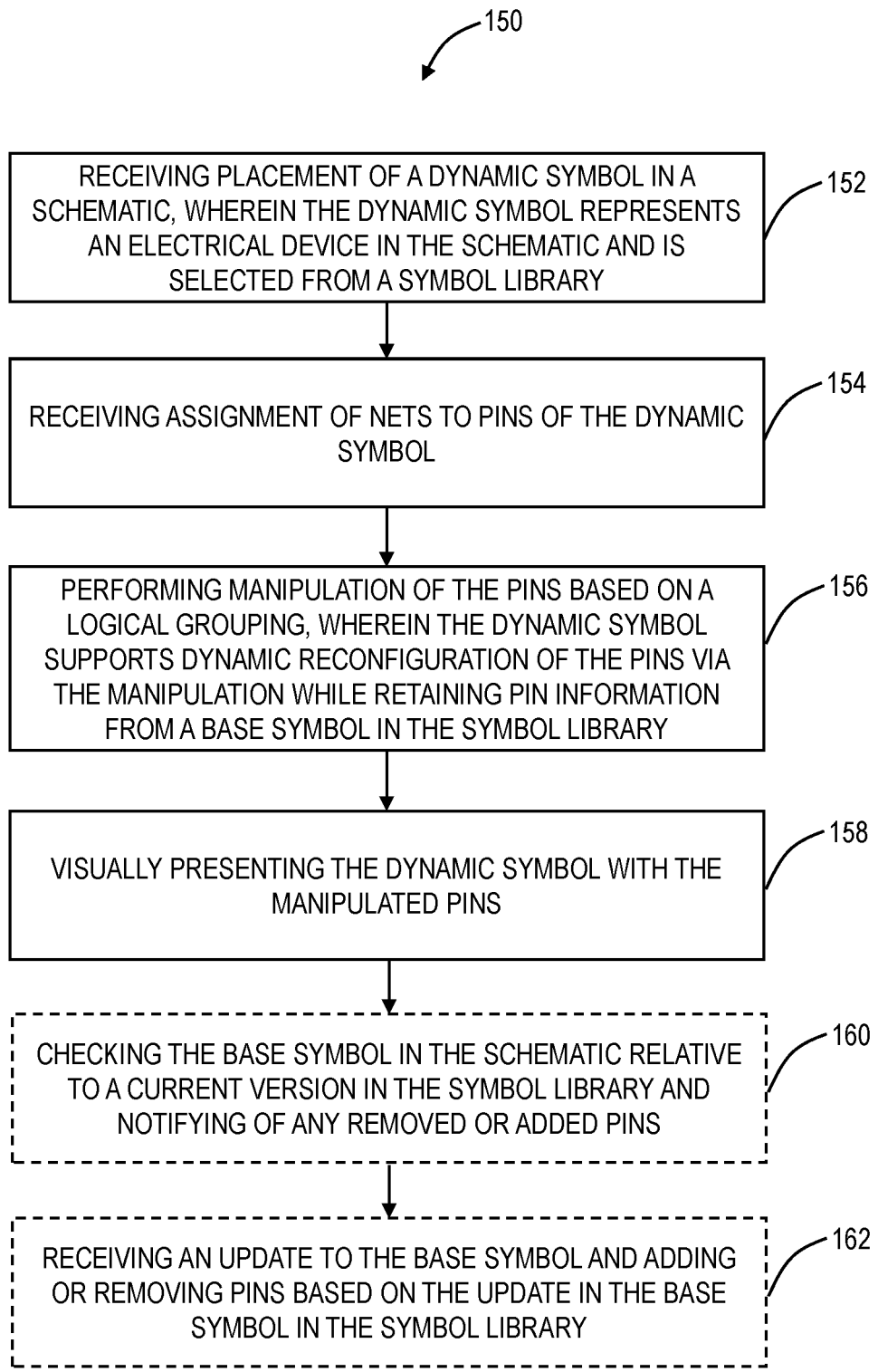
FIG. 7 is a flowchart of another computer-implemented process for the dynamic symbol techniques via a computer program, such as a CAD program.

Referring to FIG. 7, in an exemplary embodiment, a flowchart illustrates a computer-implemented process 150 for the dynamic symbol techniques via a computer program, such as a CAD program. The computer-implemented process 150 contemplates operation on a computer, such as a server illustrated in FIG. 8. For illustration purposes, the computer-implemented process 150 is described relative to activity by the computer program. The computer-implemented process 150 includes receiving placement of a dynamic symbol in a schematic, wherein the dynamic symbol represents an electrical device in the schematic and is selected from a symbol library (step 152); receiving assignment of nets to pins of the dynamic symbol (step 154); performing manipulation of the pins based on a logical grouping, wherein the dynamic symbol supports dynamic reconfiguration of the pins via the manipulation while retaining pin information from a base symbol in the symbol library (step 156); and visually presenting the dynamic symbol with the manipulated pins (step 158).

The manipulation can be based on input provided by dragging and dropping the pins to a block associated with the dynamic symbol. The manipulation can also be based on one of table-based input and file-based input which provides the logical grouping. The computer-implemented process 150 can further include checking the base symbol in the schematic relative to a current version in the symbol library and notifying of any removed or added pins (step 160). The computer-implemented process 150 can further include receiving an update to the base symbol and adding or removing pins based on the update in the base symbol in the symbol library (step 162). The computer-implemented process 150 can be performed through a Computer Aided Design (CAD) software program implemented on a server for electrical schematic design. The electrical device is a Field Programmable Gate Array (FPGA). The logical grouping can be based on one of a functional grouping of the pins, a design preference, and a combination thereof.

Server

Figure 8:
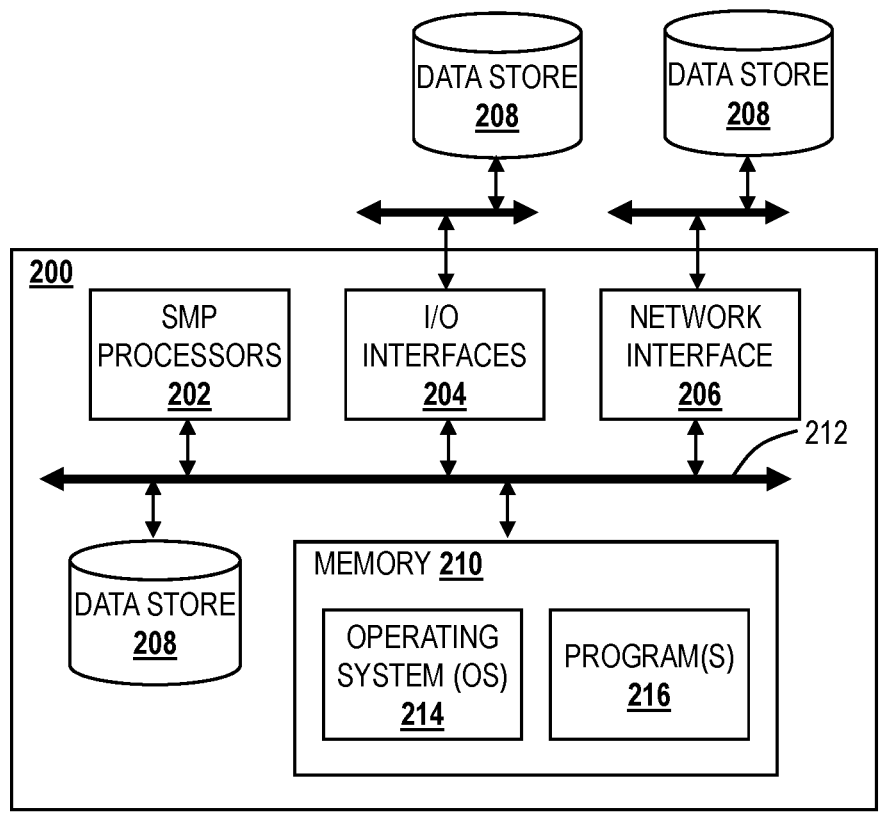
FIG. 8 is a block diagram of a server for implementing the computer-implemented systems and methods.

Referring to FIG. 8, in an exemplary embodiment, a block diagram illustrates a server 200 for implementing the computer-implemented method 10, 100, 150. The server 200 may be a digital computer or other type of processing system that, in terms of hardware architecture, generally includes one or more processors 202, input/output (I/O) interfaces 204, a network interface 206, a data store 208, and memory 210. It should be appreciated by those of ordinary skill in the art that FIG. 8 depicts the server 200 in an oversimplified manner, and a practical embodiment may include less or additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processors 202 are a hardware device for executing software instructions. The processors 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processors 202 are configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter or a wireless local area network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an exemplary embodiment, the server 200 is adapted to provide dynamic symbols for devices in an electrical schematic. Again, the server 200 includes the processor 202 and the memory 210 storing instructions that, when executed, cause the processor 202 to receive placement of a dynamic symbol in a schematic, wherein the dynamic symbol represents an electrical device in the schematic and is selected from a symbol library, receive assignment of nets to pins of the dynamic symbol, perform manipulation of the pins based on a logical grouping, wherein the dynamic symbol supports dynamic reconfiguration of the pins via the manipulation while retaining pin information from a base symbol in the symbol library, and visually present the dynamic symbol with the manipulated pins. The manipulation can be based on input provided by dragging and dropping the pins to a block associated with the dynamic symbol. The manipulation can be based on one of table-based input and file-based input which provides the logical grouping.

The memory 210 storing instructions that, when executed, can further cause the processor to check the base symbol in the schematic relative to a current version in the symbol library and notifying of any removed or added pins. The memory 210 storing instructions that, when executed, can further cause the processor to receive an update to the base symbol and adding or removing pins based on the update in the base symbol in the symbol library. The server 200 can execute a Computer Aided Design (CAD) software program for electrical schematic design. The electrical device can be a Field Programmable Gate Array (FPGA). The logical grouping can be based on one of a functional grouping of the pins, a design preference, and a combination thereof.

In a further exemplary embodiment, software stored in a non-transitory computer readable medium includes instructions that, when executed, cause a processor to perform the steps of: receiving placement of a dynamic symbol in a schematic, wherein the dynamic symbol represents an electrical device in the schematic and is selected from a symbol library; receiving assignment of nets to pins of the dynamic symbol; performing manipulation of the pins based on a logical grouping, wherein the dynamic symbol supports dynamic reconfiguration of the pins via the manipulation while retaining pin information from a base symbol in the symbol library; and visually presenting the dynamic symbol with the manipulated pins. The instructions that, when executed, can further cause the processor to perform the step of: checking the base symbol in the schematic relative to a current version in the symbol library and notifying of any removed or added pins. The instructions that, when executed, can further cause the processor to perform the step of: receiving an update to the base symbol and adding or removing pins based on the update in the base symbol in the symbol library. The logical grouping can be based on one of a functional grouping of the pins, a design preference, and a combination thereof.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method for manipulation of dynamic symbols for devices in an electrical schematic, the computer-implemented method comprising:
   receiving a placement of a dynamic symbol in a schematic, wherein the dynamic symbol represents an instance of an electrical device in the schematic and is separate from a symbol library;
   receiving an assignment of nets to pins of the dynamic symbol instance;
   performing a manipulation of the pins based on a logical grouping, wherein the dynamic symbol instance supports dynamic reconfiguration of the pins via the manipulation while retaining pin information from a base symbol in the symbol library; and
   visually presenting the dynamic symbol instance with the manipulated pins according to the logical grouping.

2. The computer-implemented method of claim 1, wherein the manipulation is performed based on an input provided by dragging and dropping the pins to a visual block associated with the dynamic symbol instance.

3. The computer-implemented method of claim 1, wherein the manipulation is performed based on one of table-based input and file-based input which provides the logical grouping for the dynamic symbol instance.

4. The computer-implemented method of claim 1, further comprising:
   checking relative to the base symbol in the library a current version of the dynamic symbol instance and notifying of any removed or added pins.

5. The computer-implemented method of claim 1, further comprising:
   receiving an update to the dynamic symbol instance and adding or removing pins based on the update in the dynamic symbol instance, the update including one of a table input and an uploaded file.

6. The computer-implemented method of claim 1, wherein the computer-implemented method is performed through a Computer Aided Design (CAD) software program implemented on a computer employed for electrical schematic design.

7. The computer-implemented method of claim 1, wherein the electrical device is one of a Field Programmable Gate Array (FPGA), ASIC, analog device, general digital device.

8. The computer-implemented method of claim 1, wherein the logical grouping is based on one of a functional grouping of the pins, a design preference, and a combination thereof.

9. A computer adapted to manipulate dynamic symbols for devices in an electrical schematic, the computer comprising:
a processor; and
memory storing instructions that, when executed by the processor, cause the processor to
receive a placement of a dynamic symbol in a schematic, wherein the dynamic symbol represents an instance of an electrical device in the schematic and is separate from a symbol library,
receive an assignment of nets to pins of the dynamic symbol instance,
perform a manipulation of the pins based on a logical grouping, wherein the dynamic symbol instance supports dynamic reconfiguration of the pins via the manipulation while retaining pin information from a base symbol in the symbol library, and
visually present the dynamic symbol instance with the manipulated pins according to the logical grouping.

10. The computer of claim 9, wherein the manipulation is performed based on an input provided by dragging and dropping the pins to a visual block associated with the dynamic symbol instance.

11. The computer of claim 9, wherein the manipulation is performed based on one of table-based input and file-based input which provides the logical grouping for the dynamic symbol instance.

12. The computer of claim 9, wherein the memory storing instructions that, when executed, further cause the processor to
check relative to the base symbol in the library a current version of the dynamic symbol instance and notify of any removed or added pins.

13. The computer of claim 9, wherein the memory storing instructions that, when executed, further cause the processor to
receive an update to the dynamic symbol instance and add or remove pins based on the update in the dynamic symbol instance, the update including one of a table input and an uploaded file.

14. The computer of claim 9, wherein the computer executes a Computer Aided Design (CAD) software program employed for electrical schematic design.

15. The computer of claim 9, wherein the electrical device is a Field Programmable Gate Array (FPGA), ASIC, analog device, general digital device.

16. The computer of claim 9, wherein the logical grouping is based on one of a functional grouping of the pins, a design preference, and a combination thereof.

17. Software stored in a non-transitory computer readable medium comprising instructions for manipulation of dynamic symbols for devices in an electrical schematic, software that, when executed by a processor, cause the processor to perform steps of:
receiving a placement of a dynamic symbol in a schematic, wherein the dynamic symbol represents an instance of an electrical device in the schematic and is separate from a symbol library;
receiving an assignment of nets to pins of the dynamic symbol instance;
performing a manipulation of the pins based on a logical grouping, wherein the dynamic symbol instance supports dynamic reconfiguration of the pins via the manipulation while retaining pin information from a base symbol in the symbol library; and
visually presenting the dynamic symbol instance with the manipulated pins according to the logical grouping.

18. The software stored in a non-transitory computer readable medium of claim 17, wherein the instructions that, when executed by the processor, further cause the processor to perform a step of:
checking relative to the base symbol in the library a current version of the dynamic symbol instance and notifying of any removed or added pins.

19. The software stored in a non-transitory computer readable medium of claim 17, wherein the instructions that, when executed by the processor, further cause the processor to perform a step of:
receiving an update to the dynamic symbol instance and adding or removing pins based on the update in the dynamic symbol instance, the update including one of a table input and an uploaded file.

20. The software stored in a non-transitory computer readable medium of claim 17, wherein the logical grouping is based on one of functional grouping of the pins, a design preference, and a combination thereof.

* * * * *